(12) United States Patent
Ishikawa

(10) Patent No.: US 8,257,876 B2
(45) Date of Patent: Sep. 4, 2012

(54) FUEL CELL SYSTEM

(75) Inventor: Norimasa Ishikawa, Asahikawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 196 days.

(21) Appl. No.: 12/742,529

(22) PCT Filed: Oct. 29, 2008

(86) PCT No.: PCT/JP2008/069601
§ 371 (c)(1),
(2), (4) Date: May 12, 2010

(87) PCT Pub. No.: WO2009/063749
PCT Pub. Date: May 22, 2009

(65) Prior Publication Data
US 2010/0255397 A1 Oct. 7, 2010

(30) Foreign Application Priority Data
Nov. 16, 2007 (JP) .................................. 2007-297887

(51) Int. Cl.
*H01M 8/04* (2006.01)
(52) U.S. Cl. ......... 429/444; 429/427; 429/428; 429/443
(58) Field of Classification Search .......... 429/400–535; 180/65.1–65.8
See application file for complete search history.

(56) References Cited

U.S. PATENT DOCUMENTS
2009/0029226 A1 * 1/2009 Yamagishi et al. ............. 429/34

FOREIGN PATENT DOCUMENTS
| JP | 2005-183357 A | 7/2005 |
| JP | 2006-099993 A | 4/2006 |
| JP | 2007-157375 A | 6/2007 |
| JP | 2007-165163 A | 6/2007 |
| JP | 2007-194169 A | 8/2007 |
| JP | 2007-194189 A | 8/2007 |
| JP | 2007-207745 A | 8/2007 |
| WO | WO 2007/072662 | * 6/2007 |

* cited by examiner

Primary Examiner — Basia Ridley
Assistant Examiner — James Lee
(74) Attorney, Agent, or Firm — Kenyon & Kenyon LLP

(57) ABSTRACT

To improve a response performance in a fuel cell system in which an on/off valve such as an injector is disposed in a fuel supply passage, by decreasing a pressure adjusting error occurring when the drive cycle of the on/off valve fluctuates. A fuel cell system comprises a fuel cell, a fuel supply passage for supplying to the fuel cell a fuel gas supplied from a fuel supply source, an on/off valve for adjusting a gas state on the upstream side of the fuel supply passage to supply the gas to the downstream side thereof, and control means for driving and controlling the on/off valve. The control means calculates a feed-forward correction flow rate based on the drive cycle of the on/off valve, corrects the command value of the gas injection flow rate of the on/off valve by use of the feed-forward correction flow rate, and drives and controls the on/off valve based on the command value.

4 Claims, 3 Drawing Sheets

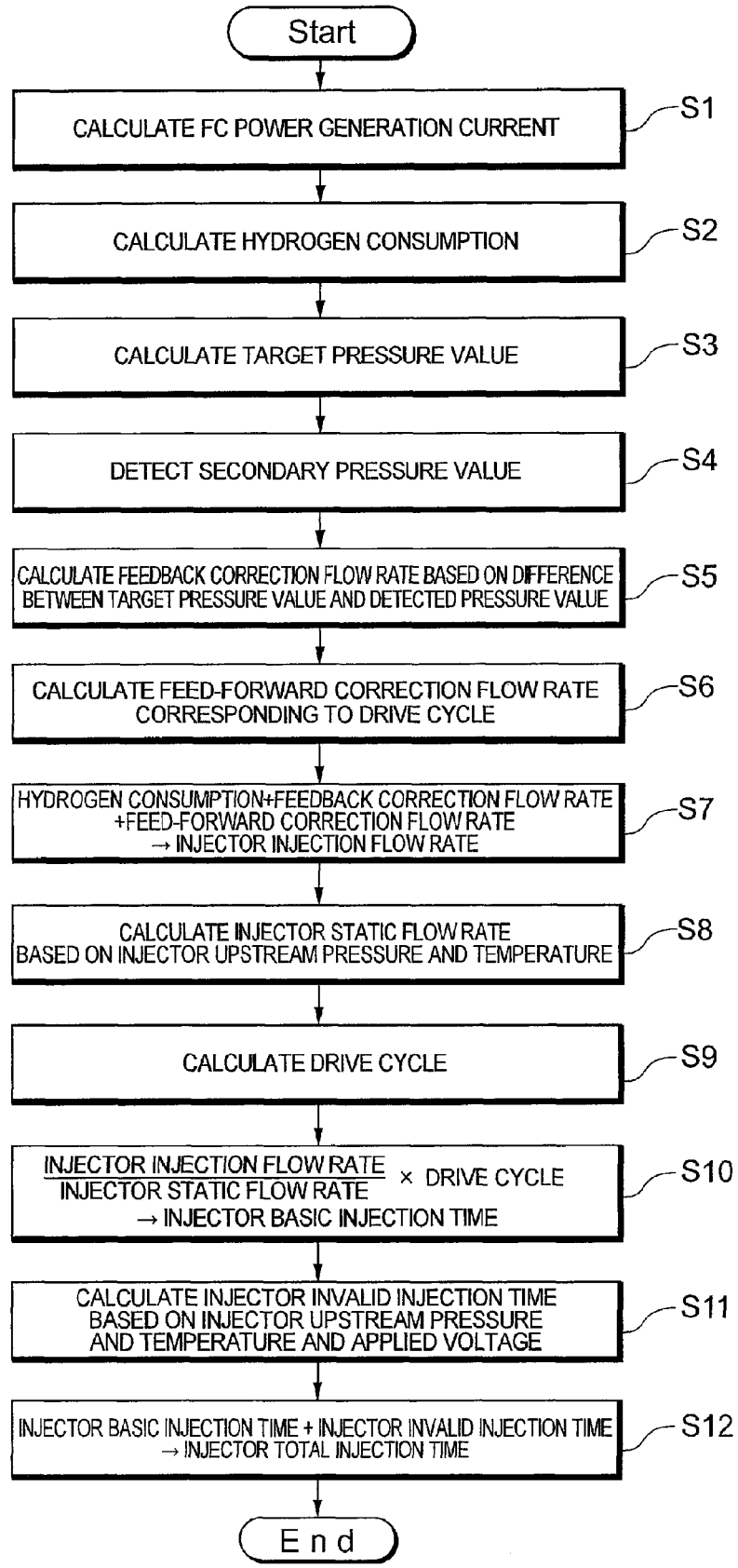

8,257,876 B2

FUEL CELL SYSTEM

This is a 371 national phase application of PCT/JP2008/069601 filed 29 Oct. 2008, which claims priority to Japanese Patent Application No. 2007-297887 filed 16 Nov. 2007, the contents of which are incorporated herein by reference.

TECHNICAL FIELD

The present invention relates to a fuel cell system.

BACKGROUND ART

At present, a fuel cell system has been suggested and put to practical use, the system including a fuel cell which receives a supplied reactant gas (a fuel gas and an oxidizing gas) to generate a power. Such a fuel cell system is provided with a fuel supply passage for supplying to the fuel cell the fuel gas supplied from a fuel supply source such as a hydrogen tank.

In recent years, a technology has been suggested in which an injector is disposed in a fuel supply passage of the fuel cell system, whereby the operation state of the injector is controlled to regulate the pressure of the fuel gas in the fuel supply passage (e.g., see Patent Document 1). The injector is an electromagnetic driving type on/off valve in which a valve body is directly driven with an electromagnetic driving force for a predetermined drive cycle and detached from a valve seat, whereby a gas state (a gas flow rate or a gas pressure) can be regulated. A control device drives the valve body of the injector to control the injection timing and injection time of the fuel gas, whereby the flow rate or pressure of the fuel gas can be controlled.

Patent Document 1: Japanese Patent Application Laid-Open No. 2007-165163

DISCLOSURE OF THE INVENTION

Problem to be Solved by the Invention

In a conventional fuel cell system disclosed in Patent Document 1 described above, the command value of the injection flow rate of an injector is calculated by using a feedback correction value or a feed-forward correction value, and the operation of the injector is controlled based on the command value. However, in such a conventional fuel cell system, when the command value of the injection flow rate is calculated, "a drive cycle" is not taken into consideration. Therefore, when the drive cycle fluctuates, a pressure adjusting error increases (a difference between a detected pressure value in the vicinity of the injector and a predetermined target pressure value increases) on occasion.

The present invention has been developed in view of such a situation, and an object thereof is to improve a response performance in a fuel cell system in which an on/off valve such as an injector is disposed in a fuel supply passage, by decreasing a pressure adjusting error occurring when the drive cycle of the on/off valve fluctuates.

Means for Solving the Problem

To achieve the above object, a fuel cell system according to the present invention is a fuel cell system comprising a fuel cell; a fuel supply passage through which a fuel gas supplied from a fuel supply source is supplied to the fuel cell; an on/off valve which regulates a gas state on the upstream side of the fuel supply passage to supply the gas to the downstream side of the fuel supply passage; and control means for driving and controlling the on/off valve, wherein the control means calculates a feed-forward correction flow rate based on the drive cycle of the on/off valve, corrects the command value of the gas injection flow rate of the on/off valve by use of the feed-forward correction flow rate, and drives and controls the on/off valve based on the command value.

When such a constitution is employed, the command value of the gas injection flow rate of the on/off valve is corrected by using the feed-forward correction flow rate calculated based on the drive cycle of the on/off valve, whereby the on/off valve can be driven and controlled based on the command value. Therefore, even when the drive cycle of the on/off valve fluctuates, the command value of the gas injection flow rate can be corrected in consideration of the fluctuating drive cycle, whereby a pressure adjusting error can be decreased (a difference between a detected pressure value in the vicinity of the on/off valve and a predetermined target pressure value can be decreased), and a response performance can be improved. It is to be noted that "the gas state" means a gas state represented by a flow rate, a pressure, a temperature, a molecular concentration or the like, and especially includes at least one of the gas flow rate and the gas pressure.

The fuel cell system may comprise a fuel circulation system having a circulation passage which returns the gas discharged from the fuel cell to the fuel supply passage. In such a case, it is possible to employ the control means for calculating the feed-forward correction flow rate based on the drive cycle of the on/off valve, the volume of the fuel circulation system and a gas temperature in the fuel circulation system. It is to be noted that "the fuel circulation system" means a space constituted of a part (a part on the downstream side from a joining part between the fuel supply passage and the circulation passage) of the fuel supply passage, a fuel gas passage in the fuel cell and the circulation passage.

Moreover, in the fuel cell system, an injector may be employed as the on/off valve.

Effect of the Invention

The present invention improves a response performance in a fuel cell system in which an on/off valve such as an injector is disposed in a fuel supply passage, by decreasing a pressure adjusting error occurring when the drive cycle of the on/off valve fluctuates.

BEST MODE FOR CARRYING OUT THE INVENTION

Hereinafter, a fuel cell system 1 according to an embodiment of the present invention will be described with reference to the drawings. In the present embodiment, there will be described an example in which the present invention is applied to a car-mounted power generation system of a fuel cell vehicle.

First, a constitution of the fuel cell system 1 according to the embodiment of the present invention will be described with reference to FIGS. 1 and 2.

As shown in FIG. 1, the fuel cell system 1 according to the present embodiment comprises a fuel cell 10 which receives a supplied reactant gas (an oxidizing gas and a fuel gas) to generate a power, and also comprises an oxidizing gas piping system 2 which supplies air as the oxidizing gas to the fuel cell 10; a hydrogen gas piping system 3 which supplies a hydrogen gas as the fuel gas to the fuel cell 10; a control device 4 which generally controls the whole system and the like.

The fuel cell 10 has a stack structure in which the required number of unitary cells are stacked, each of the unitary cells being configured to receive the supplied reactant gas and generate the power. The power generated by the fuel cell 10 is supplied to a power control unit (PCU) 11. The PCU 11 comprises an inverter, a DC-DC converter and the like arranged between the fuel cell 10 and a traction motor 12. Moreover, a current sensor 13 which detects a current during the power generation is attached to the fuel cell 10.

The oxidizing gas piping system 2 has an air supply passage 21 which supplies to the fuel cell 10 the oxidizing gas (the air) humidified by a humidifier 20; an air discharge passage 22 which guides to the humidifier 20 an oxidizing off gas discharged from the fuel cell 10; and an exhaust passage 23 which guides the oxidizing off gas from the humidifier 20 to the outside. The air supply passage 21 is provided with a compressor 24 which takes the oxidizing gas from the atmosphere to forward the gas under pressure to the humidifier 20.

The hydrogen gas piping system 3 comprises a hydrogen tank 30 as a fuel supply source in which the hydrogen gas having a high pressure (e.g., 70 MPa) is received; a hydrogen supply passage 31 as a fuel supply passage for supplying the hydrogen gas of the hydrogen tank 30 to the fuel cell 10; and a circulation passage 32 for returning to the hydrogen supply passage 31 a hydrogen off gas discharged from the fuel cell 10. It is to be noted that instead of the hydrogen tank 30, a reformer which forms a hydrogen-rich reformed gas from a hydrocarbon-based fuel, and a high-pressure gas tank which brings the reformed gas formed by the reformer into a high-pressure state to accumulate the pressure may be employed as a fuel supply source. Moreover, a tank having a hydrogen occluded alloy may be employed as the fuel supply source.

The hydrogen supply passage 31 is provided with a shut valve 33 which shuts or allows the supply of the hydrogen gas from the hydrogen tank 30, a regulator 34 which regulates the pressure of the hydrogen gas and an injector 35. Moreover, on the upstream side of the injector 35, there are provided a primary pressure sensor 41 and a temperature sensor 42 for detecting the pressure and temperature of the hydrogen gas in the hydrogen supply passage 31. Moreover, on the downstream side of the injector 35 and on the upstream side of a joining part between the hydrogen supply passage 31 and the circulation passage 32, a secondary pressure sensor 43 is provided which detects the pressure of the hydrogen gas in the hydrogen supply passage 31.

The regulator 34 is a device which regulates the upstream pressure (the primary pressure) of the regulator into a preset secondary pressure. In the present embodiment, a mechanical type pressure reduction valve for decreasing the primary pressure is employed as the regulator 34. As a constitution of the mechanical type pressure reduction valve, a known constitution may be employed which has a housing comprising a back pressure chamber, a pressure adjusting chamber and a diaphragm as a partition between the chambers. The primary pressure is decreased to a predetermined pressure in the pressure adjusting chamber by a back pressure in the back pressure chamber, thereby obtaining a secondary pressure. In the present embodiment, as shown in FIG. 1, two regulators 34 are arranged on the upstream side of the injector 35, whereby the pressure on the upstream side of the injector 35 can effectively be decreased. This can increase a degree of freedom in the design of the mechanical structure (the valve body, housing, passage, driving device or the like) of the injector 35. Moreover, since the upstream pressure of the injector 35 can be decreased, it is possible to suppress a problem that the valve body of the injector 35 cannot easily move owing to the increase of a differential pressure between the upstream pressure and the downstream pressure of the injector 35. Therefore, the variable pressure adjusting range of the downstream pressure of the injector 35 can be enlarged, and the deterioration of the response performance of the injector 35 can be suppressed.

The injector 35 is an electromagnetic driving type on/off valve in which a valve body is directly driven with an electromagnetic driving force for a predetermined drive cycle and detached from a valve seat, whereby a gas flow rate or a gas pressure can be regulated. The injector 35 comprises the valve seat having an injection hole which injects a gas fuel such as the hydrogen gas, and also comprises a nozzle body which supplies and guides the gas fuel to the injection hole, and the valve body movably received and held in an axial direction (a gas flow direction) with respect to the nozzle body to open or close the injection hole. The valve body of the injector 35 is driven by, for example, a solenoid, and a pulse-like excitation current to be supplied to the solenoid is turned on or off, whereby the open area of the injection hole can be switched in two or multiple stages. The gas injection time and gas injection timing of the injector 35 are controlled in accordance with a control signal output from the control device 4, whereby the flow rate and pressure of the hydrogen gas are controlled with high accuracy. In the injector 35, the valve (the valve body and valve seat) is directly driven to open or close with the electromagnetic driving force, and the drive cycle of the valve can be controlled to a high response region, whereby the valve has a high response performance.

It is to be noted that in the present embodiment, as shown in FIG. 1, the injector 35 is disposed on the upstream side from a joining part A1 between the hydrogen supply passage 31 and the circulation passage 32. Moreover, as shown by broken lines in FIG. 1, when a plurality of hydrogen tanks 30 are employed as the fuel supply source, the injector 35 is disposed on the downstream side from a part (a hydrogen gas joining part A2) where the hydrogen gases supplied from the hydrogen tanks 30 join each other.

The circulation passage 32 is connected to a discharge passage 38 via a gas-liquid separator 36 and a gas/water discharge valve 37. The gas-liquid separator 36 collects water from the hydrogen off gas. The gas/water discharge valve 37 operates in accordance with a command from the control device 4 to discharge (purge) to the outside the water collected by the gas-liquid separator 36 and the hydrogen off gas including impurities in the circulation passage 32. Moreover, the circulation passage 32 is provided with a hydrogen pump 39 which pressurizes the hydrogen off gas in the circulation passage 32 to forward the gas to a hydrogen supply passage 31 side. The hydrogen off gas discharged through the gas/water discharge valve 37 and the discharge passage 38 is diluted by a diluter 40 to join the oxidizing off gas in the exhaust passage 23. It is to be noted that a fuel circulation system in the present invention is constituted of a part of the hydrogen supply passage 31 on the downstream side from the joining part A1, the fuel gas passage formed in the separator of the fuel cell 10 and the circulation passage 32.

The control device 4 detects the operation amount of an accelerating operation member (an accelerator or the like) provided in a vehicle, and receives control information such as an acceleration demand value (e.g., a demand power generation amount from a load device such as the traction motor 12) to control the operations of various devices in the system. It is to be noted that in addition to the traction motor 12, the load devices generically include auxiliary devices (e.g., a motor for the compressor 24, a motor for the hydrogen pump 39, etc.) necessary for operating the fuel cell 10; actuators used in various devices (a change gear, a wheel control device, a steering device, a suspension device, etc.) associated with the running of the vehicle; and power consumption devices including an air conditioning device (the air conditioner), a light fixture, an audio and the like for a passenger space.

The control device 4 is a computer system (not shown). Such a computer system includes a CPU, an ROM, an RAM, an HDD, an input/output interface, a display and the like, and the CPU reads and executes various control programs recorded in the ROM to realize various control operations.

Specifically, as shown in FIG. 2, the control device 4 calculates the amount (hereinafter referred to as "the hydrogen consumption") of the hydrogen gas consumed by the fuel cell 10, based on the operation state (a current value during the power generation of the fuel cell 10, detected by the current sensor 13) of the fuel cell 10 (a fuel consumption calculating function: B1). In the present embodiment, the hydrogen consumption is calculated and updated for each calculation cycle of the control device 4, by use of a specific calculation formula indicating a relation between the current value and the hydrogen consumption of the fuel cell 10.

Moreover, the control device 4 calculates the target pressure value (a target gas supply pressure to the fuel cell 10) of the hydrogen gas at the downstream position of the injector 35 based on the operation state (the current value during the power generation of the fuel cell 10, detected by the current sensor 13) of the fuel cell 10 (a target pressure value calculating function: B2). In the present embodiment, the target pressure value at a position provided with the secondary pressure sensor 43 is calculated and updated for each calculation cycle of the control device 4 by use of a specific map indicating the relation between the current value and the target pressure value of the fuel cell 10.

Furthermore, the control device 4 calculates a feedback correction flow rate based on a difference between the calculated target pressure value and the pressure value (the detected pressure value) of the downstream position of the injector 35 detected by the secondary pressure sensor 43 (a feedback correction flow rate calculating function: B3). The feedback correction flow rate is a hydrogen gas flow rate to be added to the hydrogen consumption so as to decrease the difference between the target pressure value and the detected pressure value. In the present embodiment, the feedback correction flow rate is calculated and updated for each calculation cycle of the control device 4 by use of a PI type feedback control rule.

In addition, the control device 4 calculates the drive cycle of the injector 35 based on the calculated hydrogen consumption and the primary pressure value (the pressure of the hydrogen gas on the upstream side of the injector 35) detected by the primary pressure sensor 41 (a primary drive cycle calculating function: B4). Here, the drive cycle is the period of a stepped (on/off) waveform indicating the opening/closing state of the injection hole of the injector 35. In the present embodiment, the drive cycle is calculated and updated for each calculation cycle of the control device 4 by use of a specific map indicating a relation among the hydrogen consumption and the primary pressure value and the drive cycle. It is to be noted that the drive cycle calculated herein is a virtual value used only for the calculation of the feed-forward correction flow rate.

Moreover, the control device 4 calculates the feed-forward correction flow rate based on the calculated drive cycle, a pressure deviation (the difference between the target pressure value and the detected pressure value) and the like (a feed-forward correction flow rate calculating function: B5). In the present embodiment, a feed-forward gain $G_{FF}$ corresponding to the drive cycle or the like is calculated by using the following relational equation, and the feed-forward gain $G_{FF}$ is multiplied by the pressure deviation to calculate the feed-forward correction flow rate. The control device 4 functions as control means in the present invention.

$$G_{FF} = k \times V \times \frac{273}{273+T} \times \frac{1000}{T_{cycle}} \times 60 \qquad \text{[Equation 1]}$$

Additionally, in the above relational equation, (=1/101.3) is a unit conversion coefficient. Moreover, in the above relational equation, V (L) is the volume of the fuel circulation system (the volume of a space constituted of the part of the hydrogen supply passage 31 on the downstream side from the joining part A1, the fuel gas passage formed in the separator of the fuel cell 10 and the circulation passage 32). Moreover, in the above relational equation, T (° C.) is the estimated value of the temperature of the hydrogen gas on the downstream side of the injector 35 in the hydrogen supply passage 31. In the present embodiment, the temperature of the hydrogen gas on the downstream side of the injector 35 is estimated based on the temperature of the hydrogen gas detected by the temperature sensor 42. Moreover, in the above relational equation, Tcycle (ms) is the calculated drive cycle of the injector 35. When the feed-forward $G_{FF}$ calculated by such a relational equation is employed, the detected pressure value can be brought close to the target pressure value for one drive cycle of the injector 35.

Furthermore, the control device 4 calculates the upstream static flow rate of the injector 35 based on the upstream gas state (the pressure of the hydrogen gas detected by the primary pressure sensor 41 and the temperature of the hydrogen gas detected by the temperature sensor 42) of the injector 35 (a static flow rate calculating function: B6). In the present embodiment, the static flow rate is calculated and updated for each calculation cycle of the control device 4 by use of a specific calculation formula indicating a relation among the pressure and the temperature and the static flow rate of the hydrogen gas on the upstream side of the injector 35.

In addition, the control device 4 calculates the invalid injection time of the injector 35 based on the upstream gas state (the pressure and temperature of the hydrogen gas) of the injector 35 and an applied voltage (an invalid injection time calculating function: B7). Here, the invalid injection time is a time required from a time when the injector 35 receives the control signal from the control device 4 to a time when the injection is actually started. In the present embodiment, the invalid injection time is calculated and updated for each calculation cycle of the control device 4 by use of a specific map indicating a relation among the pressure and temperature of the hydrogen gas and the applied voltage and the invalid injection time on the upstream side of the injector 35.

Moreover, the control device 4 adds up the hydrogen consumption, the feedback correction flow rate and the feed-forward correction flow rate to calculate the injection flow rate of the injector 35 (an injection flow rate calculating function: B8). Furthermore, the control device 4 calculates the drive cycle of the injector 35 based on the injection flow rate of the injector 35 and the primary pressure value detected by the primary pressure sensor 41 (a secondary drive cycle calculating function: B9). In the present embodiment, the drive cycle is calculated and updated for each calculation cycle of the control device 4 by use of a specific map indicating a relation among the injection flow rate and the primary pressure value and the drive cycle of the injector 35.

Furthermore, the control device 4 multiplies, by the drive cycle of the injector 35, a value obtained by dividing the injection flow rate of the injector 35 by the static flow rate, to calculate the basic injection time of the injector 35, and adds up the basic injection time and the invalid injection time to calculate the total injection time of the injector 35 (a total injection time calculating function: B10). Then, the control device 4 outputs the control signal for realizing the total injection time of the injector 35 calculated by the above procedure, controls the gas injection time and gas injection timing of the injector 35 and regulates the flow rate and pressure of the hydrogen gas to be supplied to the fuel cell 10.

Next, the operation method of the fuel cell system 1 according to the present embodiment will be described with reference to a flow chart of FIG. 3.

During the usual operation of the fuel cell system 1, the hydrogen gas is supplied from the hydrogen tank 30 to a fuel pole of the fuel cell 10 through the hydrogen supply passage 31, and the humidified and regulated air is supplied to an oxidizing pole of the fuel cell 10 through the air supply passage 21, whereby a power is generated. In this case, the power (the demand power) to be discharged from the fuel cell 10 is calculated by the control device 4, and the amounts of the hydrogen gas and air corresponding to the power generation amount are supplied into the fuel cell 10. In the present embodiment, the pressure of the hydrogen gas supplied to the fuel cell 10 during such a usual operation is controlled with high accuracy.

That is, the control device 4 of the fuel cell system 1 first detects the current value during the power generation of the fuel cell 10 by use of the current sensor 13 (a current detection step: S1). Subsequently, the control device 4 calculates the amount of the hydrogen gas (the hydrogen consumption) consumed by the fuel cell 10 based on the current value detected by the current sensor 13 (a fuel consumption calculation step: S2).

Then, the control device 4 calculates the target pressure value of the hydrogen gas at the downstream position of the injector 35 based on the current value detected by the current sensor 13 (a target pressure value calculation step: S3). Moreover, the control device 4 detects the pressure value at the downstream position of the injector 35 by use of the secondary pressure sensor 43 (a pressure value detection step: S4). Then, the control device 4 calculates the feedback correction flow rate based on the difference (the pressure deviation) between the target pressure value calculated in the target pressure value calculation step S3 and the pressure value (the detected pressure value) detected in the pressure value detection step S4 (a feedback correction flow rate calculation step: S5).

Moreover, the control device 4 calculates the drive cycle (the virtual value) of the injector 35 based on the hydrogen consumption calculated in the fuel consumption calculation step S2 and the primary pressure value (the upstream pressure of the hydrogen gas of the injector 35) detected by the primary pressure sensor 41, and calculates the feed-forward correction flow rate based on the calculated drive cycle, the pressure deviation and the like (a feed-forward correction flow rate calculation step: S6).

Subsequently, the control device 4 adds up the hydrogen consumption calculated in the fuel consumption calculation step S2, the feedback correction flow rate calculated in the feedback correction flow rate calculation step S5 and the feed-forward correction flow rate calculated in the feed-forward correction flow rate calculation step S6, to calculate the injection flow rate of the injector 35 (an injection flow rate calculation step: S7).

Next, the control device 4 calculates the upstream static flow rate of the injector 35 based on the primary pressure detected by the primary pressure sensor 41 and the upstream temperature of the hydrogen gas of the injector 35 detected by the temperature sensor 42 (a static flow rate calculation step: S8). Moreover, the control device 4 calculates the drive cycle of the injector 35 based on the injection flow rate of the injector 35 calculated in the injection flow rate calculation step S7 and the primary pressure value detected by the primary pressure sensor 41 (a drive cycle calculation step: S9). Then, the control device 4 multiplies, by the drive cycle of the injector 35, the value obtained by dividing the injection flow rate of the injector 35 by the static flow rate, to calculate the basic injection time of the injector 35 (a basic injection time calculation step: S10).

Subsequently, the control device 4 calculates the invalid injection time of the injector 35 based on the upstream pressure of the hydrogen gas of the injector 35 detected by the primary pressure sensor 41, the upstream temperature of the hydrogen gas of the injector 35 detected by the temperature sensor 42 and the applied voltage (an invalid injection time calculation step: S11). Then, the control device 4 adds up the basic injection time of the injector 35 calculated in the basic injection time calculation step S10 and the invalid injection time calculated in the invalid injection time calculation step S11, to calculate the total injection time of the injector 35 (a total injection time calculation step: S12).

Afterward, the control device 4 outputs the control signal concerning the total injection time of the injector 35 calculated in the total injection time calculation step S12, controls the gas injection time and gas injection timing of the injector 35, and regulates the flow rate and pressure of the hydrogen gas to be supplied to the fuel cell 10.

In the fuel cell system 1 according to the embodiment described above, the command value of the gas injection flow rate of the injector 35 is corrected based on the feed-forward correction flow rate calculated based on the drive cycle of the injector 35, and the injector 35 can be driven and controlled based on the command value. Therefore, even when the drive cycle of the injector 35 fluctuates, the command value of the gas injection flow rate can be corrected in consideration of the fluctuating drive cycle, whereby the pressure adjusting error can be decreased (the difference between the detected pressure value on the downstream side of the injector 35 and the predetermined target pressure value can be decreased), and a response performance can be improved.

It is to be noted that in the above embodiment, an example has been described in which the hydrogen gas piping system 3 of the fuel cell system 1 is provided with the circulation passage 32, but the fuel cell 10 may directly be connected to the discharge passage 38, and the circulation passage 32 may be omitted. Even when such a constitution (a dead end system) is employed, the control device 4 calculates the feed-forward correction flow rate in accordance with the drive cycle of the injector 35 in the same manner as in the above embodiment, whereby function and effect similar to those of the above embodiment can be obtained.

Moreover, in the above embodiment, an example has been described in which the circulation passage 32 is provided with the hydrogen pump 39, but an ejector may be employed instead of the hydrogen pump 39. Furthermore, in the above embodiment, an example has been described in which the hydrogen supply passage 31 is provided with the shut valve 33 and the regulator 34, but the injector 35 functions as a variable pressure regulation valve and also functions as a shut valve for shutting the supply of the hydrogen gas, and hence the shut valve 33 or the regulator 34 does not have to be necessarily provided. Therefore, when the injector 35 is employed, the shut valve 33 and the regulator 34 can be omitted, whereby the miniaturization and cost reduction of the system can be achieved.

Furthermore, in the above embodiment, an example has been described in which the feedback correction flow rate is calculated by using the PI type feedback control rule, but the feedback correction flow rate may be calculated by using another servo type control rule (e.g., a PID type feedback control rule).

INDUSTRIAL APPLICABILITY

As described above in an embodiment, a fuel cell system according to the present invention can be mounted on a fuel cell vehicle, and can be mounted even on various mobile bodies (a robot, a ship, an airplane, etc.) other than the fuel cell vehicle. Moreover, the fuel cell system according to the present invention may be applied to a stational power generation system used as a power generation facility for a construction (a housing, a building or the like).

BRIEF DESCRIPTION OF THE DRAWINGS

FIG. 3 is a flow chart for explaining an operation method of the fuel cell system shown in FIG. 1.

DESCRIPTION OF REFERENCE NUMERALS

Figure 1:
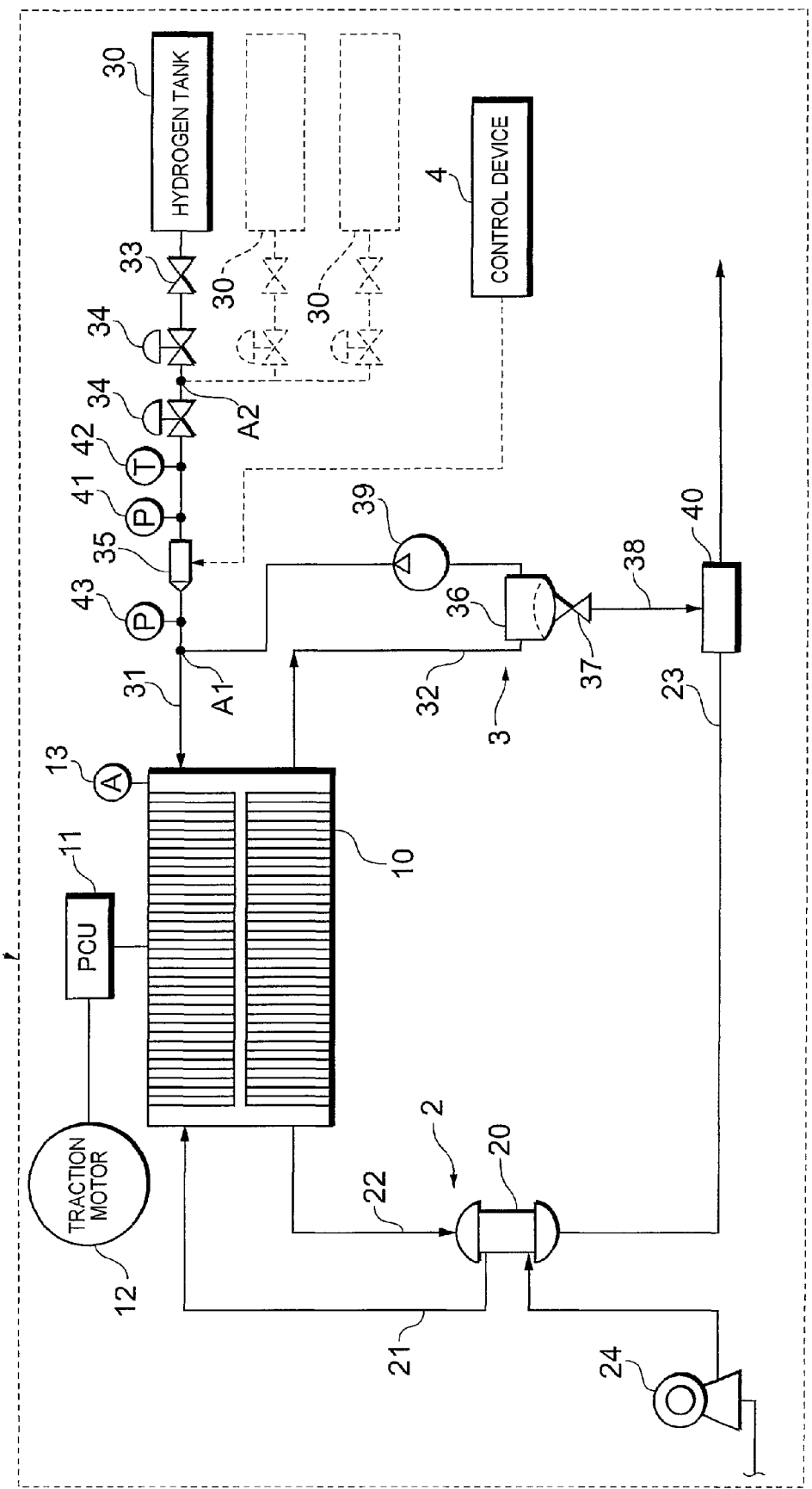
FIG. 1 is a constitution diagram of a fuel cell system according to an embodiment of the present invention.
Figure 2:
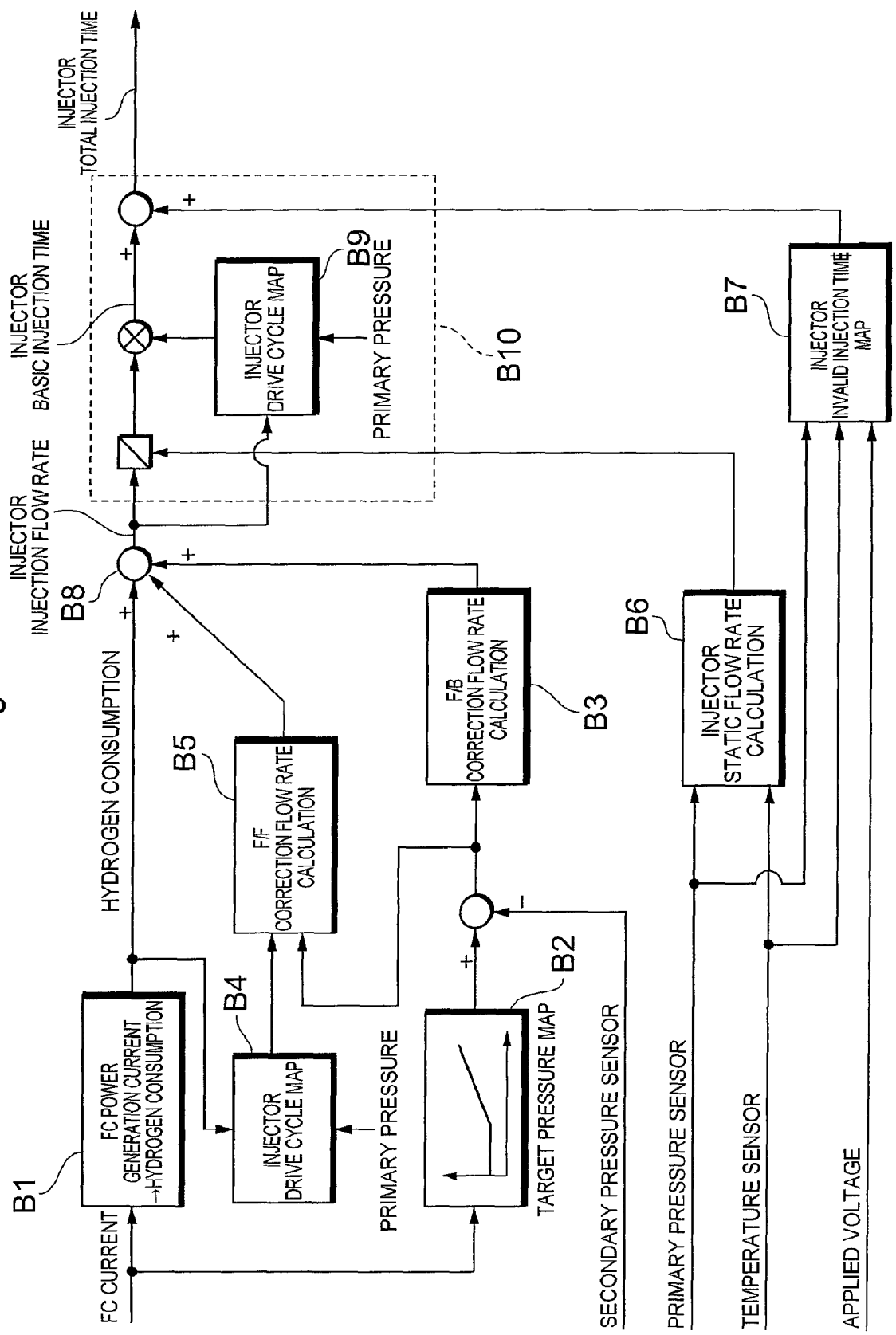
FIG. 2 is a control block diagram for explaining a control configuration of a control device of the fuel cell system shown in FIG. 1.

1 . . . fuel cell system, 4 . . . control device (control means), 10 . . . fuel cell, 30 . . . hydrogen tank (fuel supply source), 31 . . . hydrogen supply passage (fuel supply passage), 32 . . . circulation passage, and 35 . . . injector (on/off valve).

The invention claimed is:

1. A fuel cell system comprising:
a fuel cell;
a fuel supply passage through which a fuel gas supplied from a fuel supply source is supplied to the fuel cell;
an on/off valve which regulates a gas flow rate and/or a gas pressure on the upstream side of the fuel supply passage to supply the gas to the downstream side thereof;
and a control portion for driving and controlling the on/off valve such that a pressure of the fuel gas on the downstream side of the on/off valve becomes a target pressure,
wherein the control portion is programmed to calculate a virtual drive cycle based on a fuel gas consumption in the fuel cell and a pressure of the fuel gas on the upstream side of the on/off valve, to calculate a feed-forward correction flow rate based on the virtual drive cycle, to calculate a gas injection flow rate of the on/off valve based on the feed-forward correction flow rate, and to drive and control the on/off valve based on a control signal corresponding to the gas injection flow rate.

2. The fuel cell system according to claim 1, further comprising;
a fuel circulation system having a circulation passage which returns the gas discharged from the fuel cell to the fuel supply passage,
wherein the control portion calculates the feed-forward correction flow rate based on the drive cycle of the on/off valve, the volume of the fuel circulation system and a gas temperature in the fuel circulation system.

3. The fuel cell system according to claim 1, wherein the on/off valve is an injector.

4. The fuel cell system according to claim 1, further comprising:
a fuel circulation system consisting of a circulation passage for returning the gas discharged from the fuel cell to the fuel supply passage, a fuel gas passage in the fuel cell, and a part on the downstream side from a joining part between the fuel supply passage and the circulation passage,
wherein the control portion is further programmed to calculate a feed-forward gain $G_{FF}$ by multiplying, by a predetermined coefficient, a value obtained by dividing a volume of the fuel circulation system by the virtual drive cycle, to calculate the feed-forward correction flow rate by multiplying a pressure deviation, which is the difference between the pressure of the fuel gas on the downstream side of the on/off valve and the target pressure, by the feed-forward gain $G_{FF}$, and to calculate the gas injection flow rate of the on/off valve by adding a feed-back correction flow rate for reducing the pressure deviation and the feed-forward correction flow rate to the fuel gas consumption in the fuel cell.

* * * * *